(12) United States Patent
Leippe et al.

(10) Patent No.: US 9,519,463 B1
(45) Date of Patent: Dec. 13, 2016

(54) APPLICATION FOR AUTOMATICALLY GENERATING GRAPHICAL FLOWCHARTS BASED ON CONFIGURABLE MEANS

(71) Applicant: ADVANCED TESTING TECHNOLOGIES, INC., Hauppauge, NY (US)

(72) Inventors: William Harold Leippe, Coram, NY (US); William Biagiotti, St. James, NY (US)

(73) Assignee: Advanced Testing Technologies Inc., Hauppauge, NY (US)

( * ) Notice: Subject to any disclaimer, the term of this patent is extended or adjusted under 35 U.S.C. 154(b) by 845 days.

(21) Appl. No.: 13/677,635

(22) Filed: Nov. 15, 2012

(51) Int. Cl.
    *G06F 9/44*      (2006.01)

(52) U.S. Cl.
    CPC ...................... *G06F 8/34* (2013.01)

(58) Field of Classification Search
    CPC .. G06F 8/34; G06F 8/427; G05B 2219/13044; G05B 2219/13108; G05B 2219/13122; G05B 2219/23258; G05B 2219/23291; H04L 41/22
    USPC ......................................................... 717/123
    See application file for complete search history.

(56) References Cited

U.S. PATENT DOCUMENTS

| | | | |
|---|---|---|---|
| 5,446,911 A | 8/1995 | Juso et al. | |
| 6,212,677 B1 | 4/2001 | Ohkubo et al. | |
| 6,243,857 B1 | 6/2001 | Logan, III et al. | |
| 6,346,945 B1 * | 2/2002 | Mansurov et al. | 345/473 |
| 6,370,683 B1 | 4/2002 | Sobers | |
| 6,408,430 B2 | 6/2002 | Gunter et al. | |
| 7,765,097 B1 | 7/2010 | Yu et al. | |
| 2002/0007483 A1 * | 1/2002 | Lopez | 717/3 |
| 2003/0159128 A1 * | 8/2003 | Kunzler | 717/109 |
| 2005/0283758 A1 | 12/2005 | Cobcroft et al. | |
| 2012/0215481 A1 * | 8/2012 | Covey et al. | 702/123 |
| 2014/0075242 A1 * | 3/2014 | Dolinina | G06F 11/3672 714/27 |

\* cited by examiner

*Primary Examiner* — Hang Pan
*Assistant Examiner* — Hui-Wen Lin
(74) *Attorney, Agent, or Firm* — Brian Roffe

(57) ABSTRACT

Flowchart generation method and tool is provided with an easy-to-use graphical user interface. The graphical user interface of the tool enables a user to select a programming language which the test program was written in, and a test station which the test program was developed for. Upon these selections, a parser will point to the configuration files appropriate for the selected language and test station. The configuration files contain rules and definitions of the chosen programming language and test station, so that the parsing of the test program language can begin. Utilizing the data created from the parsing process, the tool points to other configuration files, referred to as a flowcharting configuration file, that each contain information on how to present the parsed data in a flow chart.

22 Claims, 3 Drawing Sheets

9,519,463 B1

APPLICATION FOR AUTOMATICALLY GENERATING GRAPHICAL FLOWCHARTS BASED ON CONFIGURABLE MEANS

FIELD OF THE INVENTION

The present invention relates generally to the automatic generation of a functional flowchart from analysis and parsing of a test program of a given or known programming language and a given or known automatic test system. The present invention also relates generally to the generation of a functional flowchart from analysis and parsing of any software application written to a specific style guide and predefined Application Programming Interface (API).

Also, the present invention relates to methods for analyzing and parsing a test program of a given or known programming language and a given or known automatic test system and automatically generating a functional flowchart from the test program analysis and parsing. Further, the present invention relates to methods for analyzing and parsing any software application written to a specific style guide and predefined API and generating a functional flowchart from the software application analysis and parsing.

BACKGROUND OF THE INVENTION

Due to the complexity of current test programs, flowcharts are a necessity in supporting these programs. Each flowchart allows users of the respective test program to understand what a particular test program is doing at a given test during execution by, for example, showing a sequence of logical operations. By viewing the sequence, the user can understand what test instrumentation is being used, parameters of the test instrumentation being programmed and/or the values of the parameters.

Manual creation of a flowchart, especially for a lengthy test program, can be a time consuming process taking up valuable engineering assets. The flowcharting process does not end there because throughout the development life cycle of the test program, the test program will change and new flowchart documentation will have to be created, once again taking up valuable time and assets.

A development team of an organization utilizing test programs typically consists of numerous engineers writing test programs for similar and/or different systems. Each of these systems may or may not use the same programming language and API calls. The keywords and constructs in these languages and API calls for controlling the instrumentation are analogous from programming language to programming language and test station to test station, but each engineer may describe these same constructs and API differently in their flowchart, thereby creating confusion and discontinuity.

With a view toward avoiding potential confusion and discontinuity, the present invention provides a specific method to correct this problem by defining a set of flowcharting rules for each analogous keyword, construct and API call.

SUMMARY OF THE INVENTION

A flowchart generation method and tool is provided with an easy-to-use graphical user interface. The graphical user interface of the tool provides the user with an easy way of selecting a programming language which the test program was developed or written in, as well as means to select the tester or test station which the test program was developed for. Upon these selections, a parser will point to the configuration files appropriate for the selected language and test station. The configuration files contain rules and definitions of the chosen programming language and test station, so that the parsing of the test program language can begin.

Utilizing the data created from the parsing process, the actual flowcharting process can start. The tool points to other configuration files, referred to as a flowcharting configuration file, that each contain information on how to present the parsed data in a flow chart. The tool provides the means through a graphical user interface to create these files so that continuity from test program to test program can be achieved.

The invention therefore provides a tool to significantly decrease the effort and time required of a skilled engineer to create and/or update a flow chart for developed test programs. It also provides the user of the flowchart generation tool the means to easily choose the programming language the test program was written in as well as the type of test station that the test program was written for. Even further, the invention provides means to an organization that produces flowcharts of test programs to create uniform flowchart descriptions for similar processes within their varying test programs.

BRIEF DESCRIPTION OF DRAWINGS

A more complete appreciation of the present invention and many of the attendant advantages thereof will be readily understood by reference to the following detailed description of the invention when considered in connection with the accompanying drawings in which.

DETAILED DESCRIPTIONS OF PREFERRED EMBODIMENTS

Figure 1:
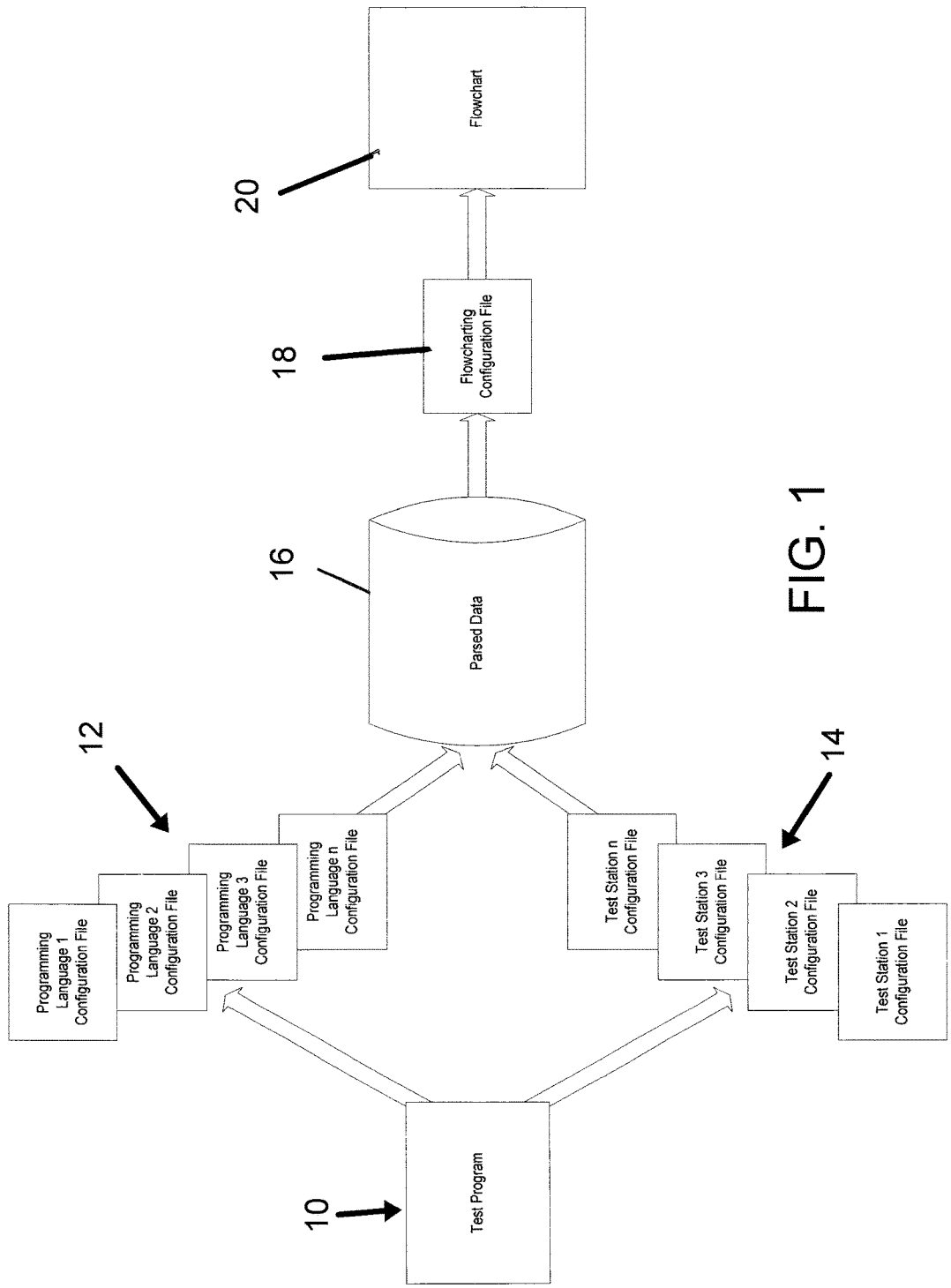
FIG. 1 shows a flow chart of an automatic flowcharting process in accordance with the invention.

Referring to the accompanying drawings, a graphical user interface (GUI) of an automatic flowchart generation tool in accordance with the invention shown diagrammatically in FIG. 1 allows a user to select a specific test program to create a flowchart for. Due to the complexity of modern day test programs, the actual test program may consist of many files. The graphical user interface allows the user to specify one of these files as a main file of the test program so that libraries and other support files may get loaded or specified based on the user's specification of the main file.

In the current automatic test equipment environment, many different test stations exist using a varying host of different test languages. For this reason, once a test program 10 has been selected, which may be effected using any user interface interacting with a processor, memory component and/or display (see FIG. 2), the automatic flowchart generation tool provides means for the user to select a programming language 12 that the test program 10 was written in. This selection, which may be effected using any user interface interacting with a processor, memory component and/or display (see FIG. 2), will cause a predefined one of the programming language configuration files 12 to be loaded. The programming language configuration files 12 include configuration files for different programming languages, e.g., one for each programming language in which a test program might be composed. Each programming language configuration file 12, one of programming language configuration files 1, 2, 3, ..., n as shown in FIG. 1, consists of regular expression definitions which contain defining keywords of the programming language, as well as construct definitions of the programming language used in creating the test program 10 into memory so that the automatic flowcharting generation tool can use them. As appreciated by those skilled in the art, the term "regular expression" is a class within the "dot net" framework that provides techniques and allows one to comprehensively parse text. Alternative constructions of programming language configuration files may also be used in accordance with the invention.

Next, the user will select the test station or operational platform that the test program 10 is written for. The test station selection may be effected using any user interface interacting with a processor, memory component and/or display (see FIG. 2). The test station selection will load another configuration file into memory, namely one of the test station 1, 2, 3, ..., n configuration files 14 (see FIG. 1), which consists of regular expression definitions defining APIs that control instrumentation which exists within the test station. Each test station configuration file 14 will define a predefined method with which to store the regular expressions. Construction of each test station configuration file 14 may be an XML schema or a database, but is not limited to those methods. These definitions act as specifications to the automatic flowcharting generation tool on how to pick out, select or determine the proper regular expressions used to parse the test program 10.

Once the appropriate programming language configuration file 12 and test station configuration file 14 have been selected using, for example, a user interface and loaded into memory, the automatic flowcharting generation tool provides one or more parsing algorithms to obtain parsed data 16. Each parsing algorithm uses regular expressions, as opposed to the conventional means of program parsers which scan lines of code character by character. The flexibility of the regular expressions technique allows the automatic flowcharting generation tool to parse either whole lines or multiple lines of code at the same time using less memory and CPU time, allowing for faster and more efficient parsing. Indeed, by parsing whole lines of computer programs at once using regular expressions, quicker execution times are provided resulting in a conversion from a computer program to flowchart in significantly less time than if the computer program were parsed on a text character-by-character basis.

Accordingly, in one embodiment, parsing of the test program 10 is performed line-by-line looking for matches, first by using the programming language regular expressions (from the programming language configuration file 12) and then the test station regular expressions (from the test station configuration file 14). If the line of the test program 10 being analyzed does not match any regular expression from the programming language configuration file 12 or the test station configuration file 14, the line is flagged to the user as unrecognized and is stored, tagged and shown in the flowchart as is. If the line in the test program 10 is recognized as a match to a regular expression in either configuration file 12, 14, the line is broken down into its different components based upon the regular expression definition and syntax of the line. The line is tagged based on the contents of the line and stored in a memory component.

As the test program is being parsed, the lines are broken down into their different components and tagged as to the type of line it is along with all of the components that make up the line of code in accordance with a predefined scheme. This scheme is defined by a data structure such as, but not limited to, an XML schema, ATML standard or tables defined in a database. The data is optionally stored in this data structure so that it can be used by flowcharting algorithms used in the invention. Alternatively, the parsed data may be used for immediate flowchart generation without having been stored.

An example of the data stored in this data structure would be, but is not limited to, the type of statement that the line of code represents or the name of the API call that is being executed during line execution. If the line of code is a construct or a keyword of the language, the parts of the statement are stored in the memory component, such as an 'if-then' statement, the evaluation expression and the 'if' consequent clause would be stored if it was in the same line of code. If the line of code is an API call, the name of the API will be saved along with values of the parameters used in the API call, if used.

One of the key parts of the automatic flowcharting generation tool is the utilization a predefined data structure such as a XML schema. A benefit of this utilization is that it provides the automatic flowcharting generation tool with a great deal of flexibility by giving it the ability to change its configuration based on the current programming language and test station, thus creating a single flowcharting method across multiple environments. Thus, the parsed data 16 may be stored according to a scheme such that similar keywords, constructs and API usage all flow the same way regardless of the programming language of the test program and/or the test station for which the test program is written. In one preferred embodiment, the data structure in which the parsed data is stored is a memory resident data structure and the scheme in which the parsed data is stored in an XML object or a database object with a predefined structure.

A predefined schema provides a unique common layer that the automatic flowcharting generation tool's flowcharting algorithm can efficiently understand as opposed to having to recognize multiple programming languages and APIs across many test stations. Structured programming languages have analogous constructs and keywords, but are represented in different ways. This common layer is used by the automatic flowcharting generation tool to represent these constructs and keywords in one unique way. The same concept applies to the APIs used by test stations to control instrumentation.

APIs may be used differently or called something different, but test instrumentation can only be programmed in a specific way. The common layer provides a way of representing the programming of the test instrumentation in an efficient reusable way.

After the parsing segment of the process is completed, the actual drawing of flowchart can be accomplished. The flowcharting process reads the parsed data 16 stored in the data structure. As the flowcharting process reads each record of the parsed data 16, the logic within the flowcharting process determines what type of flowchart shape(s) to select and show based upon the information stored in the record. The different types of flowchart shapes and the unique function of each are known to those skilled in the art.

Next, the flowcharting process determines what should be displayed inside the selected flowchart shape(s) based on the record properties that were parsed out and analyzed during the parsing process and as directed by a flowcharting configuration file 18. The flowcharting configuration file 18 contains information on how each API used by the test station should be flowcharted. Also, the flowcharting configuration file 18 contains the flowcharting shapes that should be used by the automatic flowcharting generation tool to flowchart the API use and information that would get displayed in the flowchart shape. Although only a single flowcharting configuration file 18 is depicted in FIG. 1, a plurality of flowcharting configuration files 18 may be provided in the invention and one of these selected for use either by the user or automatically depending on, for example, the selected programming language configuration file 12 and/or test station configuration file 14.

The automatic flowcharting generation tool allows the user to customize the flowcharting configuration file 18, as desired and/or required. For example, the user can using a user interface such as a keyboard interacting with a processor, define the flowcharting configuration file 18 to customize depiction of keywords, constructs and/or API references in the flowchart. In this manner, there may be several different flowcharting configuration files and the processor or user can select one of these flowcharting configuration files to use depending on the operational circumstances.

The graphical user interface of the automatic flowcharting generation tool preferably allows the user to specify a flowchart representation of every defined keyword, construct and API call. This representation can vary from a specific shape to multiple shapes of different types or types of graphics such as a table or picture. The default information in the flowcharting configuration file 18, as well as the customized information, is stored in a defined data structure, such as but not limited to, an XML file, or tables defined in a database. This data structure pairs the common layer with a flowchart representation of each defined keyword, construct and API call. It is therefore envisioned that flowcharting representation information may be stored in or within the flowcharting configuration file 18 using a scheme selected from a group consisting of a XML file and database definition.

The automatic flowcharting generation tool uses this information to control an external application through automation or a scripting language to generate the flowchart 20.

In another embodiment of the invention, the method can be used to create an output that represents the same test program but in a different programming language and/or an output that represents or controls an electronic device or devices.

Based on the concept that the automatic flowcharting generation tool has the means to use a configuration file that defines how the output is to be generated by the automatic flowcharting generation tool, instead of specifying how to represent the parsed keywords, constructs and API calls into shapes and other graphical symbols, the flowcharting configuration file 18 can also specify how to represent the parsed data 16 into text (i.e., keywords in other computer languages), thereby translating from one programming language into another. Similarly, the automatic flowcharting generation tool may also use the parsed data 16 of the keywords, constructs and API calls to generate commands to directly control any electronic device (i.e., such as test instrumentation), based solely on the direction of the output configuration file program.

The concept of this automatic flowcharting generation tool is in no way limited to the applications listed and may thus be utilized in other applications requiring configurable decision operations.

Figure 2:
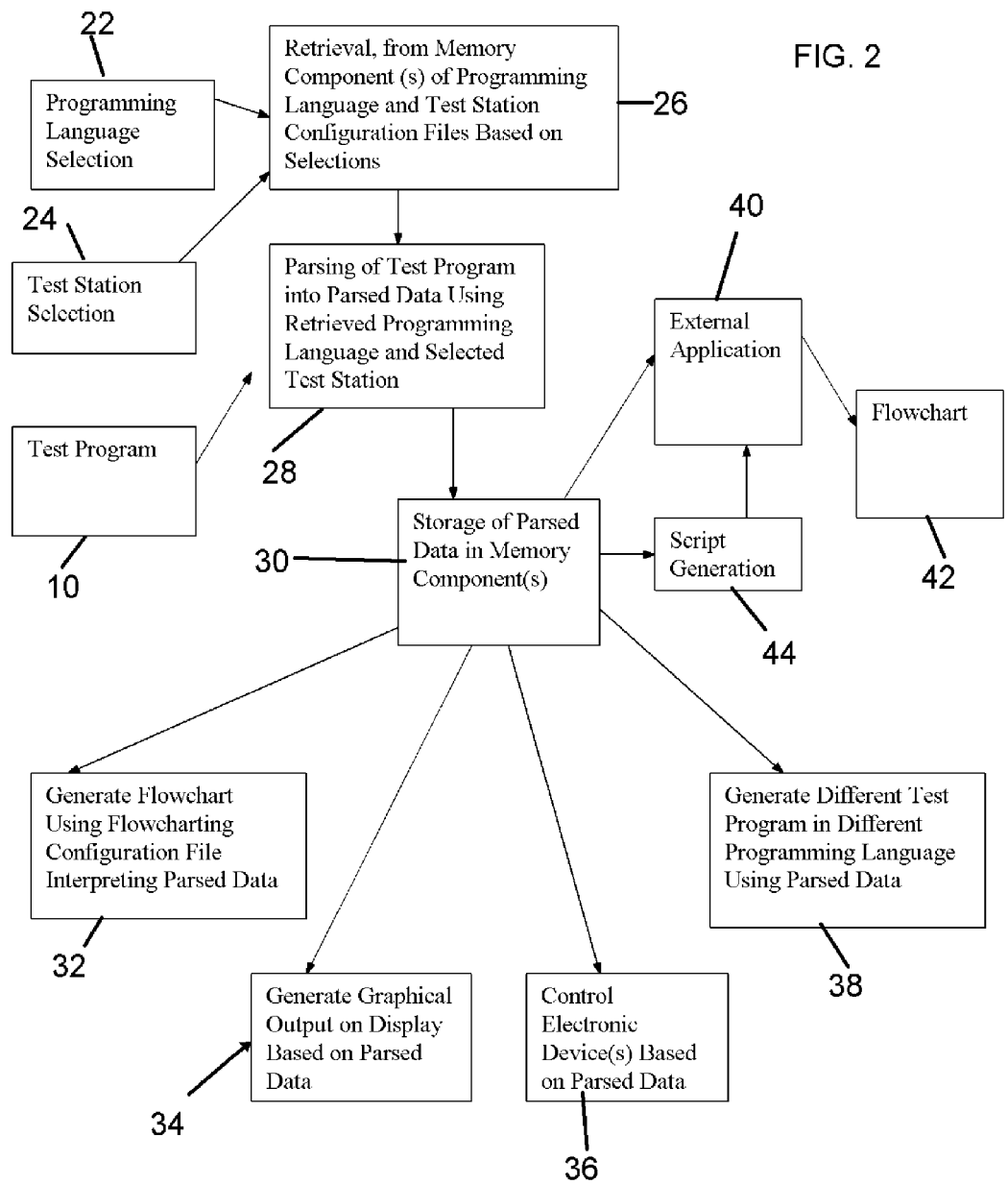
FIG. 2 shows a flow chart of the various stages of the process depicted in FIG. 1.

FIG. 2 shows a flow chart of the various stages of the process explained above. An initial stage 22 is to select, using a processor, at least one of a plurality of programming language configuration files (12 in FIG. 1) stored in at least one memory component, based on a programming language of the test program. The user would identify the programming language and manipulate a user interface accordingly, e.g., view a list of programming languages on a display and use a pointer device to select the displayed programming language. This identification may be achieved by viewing documentation related to the test program, characteristics of the test station for which the test program was written and/or the test program itself. As discussed above, each of the programming language configuration file 12 including expressions to identify lines of program code using keywords and constructs of the programming language;

Another initial stage 24 is to select, using a processor (the same or different than the one used to select the programming language), at least one of a plurality of test station configuration files 14 stored in at least one memory component, based on a test station for which the test program is written. This memory component may be the same or different than the one(s) in which the programming language configuration files are stored. This identification may be achieved by viewing documentation related to the test station, characteristics of the test station for which the test program was written and/or the test station itself. As discussed above, each test station configuration file includes regular expressions to identify lines of code that use APIs to control specific instruments of the test station.

After stages 22, 24, in stage 26, the selected programming language and test station configuration files are retrieved from the memory component(s). Using a processor and the regular expressions identified in the selected programming configuration and test program configuration files, the test program is parsed into parsed data, in stage 28. This processor may be the same processor used in the selection and/or retrieval of the programming language and test station configuration files or another processor.

The programming language and test station configuration files may be configured with a scheme to aid parsing of the test program. The scheme may be a XML file and/or involve database definitions that store the regular expressions.

The parsed data is then stored in one or more memory components, in stage 30.

Once the parsed data is stored, it can be used in one or more different ways. That is, the same data can be interpreted, using a processor and a flowcharting configuration file, with algorithms that cause generation of the flowchart according to definitions defined in the flowcharting configuration file, in stage 32. Additionally or alternatively, the parsed data can be used to generate a graphical output of the flowchart using the parsed data, in stage 34, control one or more electronic devices, in stage 36, or generate a different test program, in a different programming language than the programming language of the original test program, in stage 38.

Additionally or alternatively, the parsed data may be used to automate an external application in stage 40 that is configured to draw graphic content to represent the flowchart of the test program, in stage 42. As an intermediate stage 44, scripts interpretable into shapes, lines and other graphics may be generated based on the parsed data, with the scripts being interpreted by the external application to draw the graphic content that will represent the flowchart of the test program in stage 42.

Figure 3:
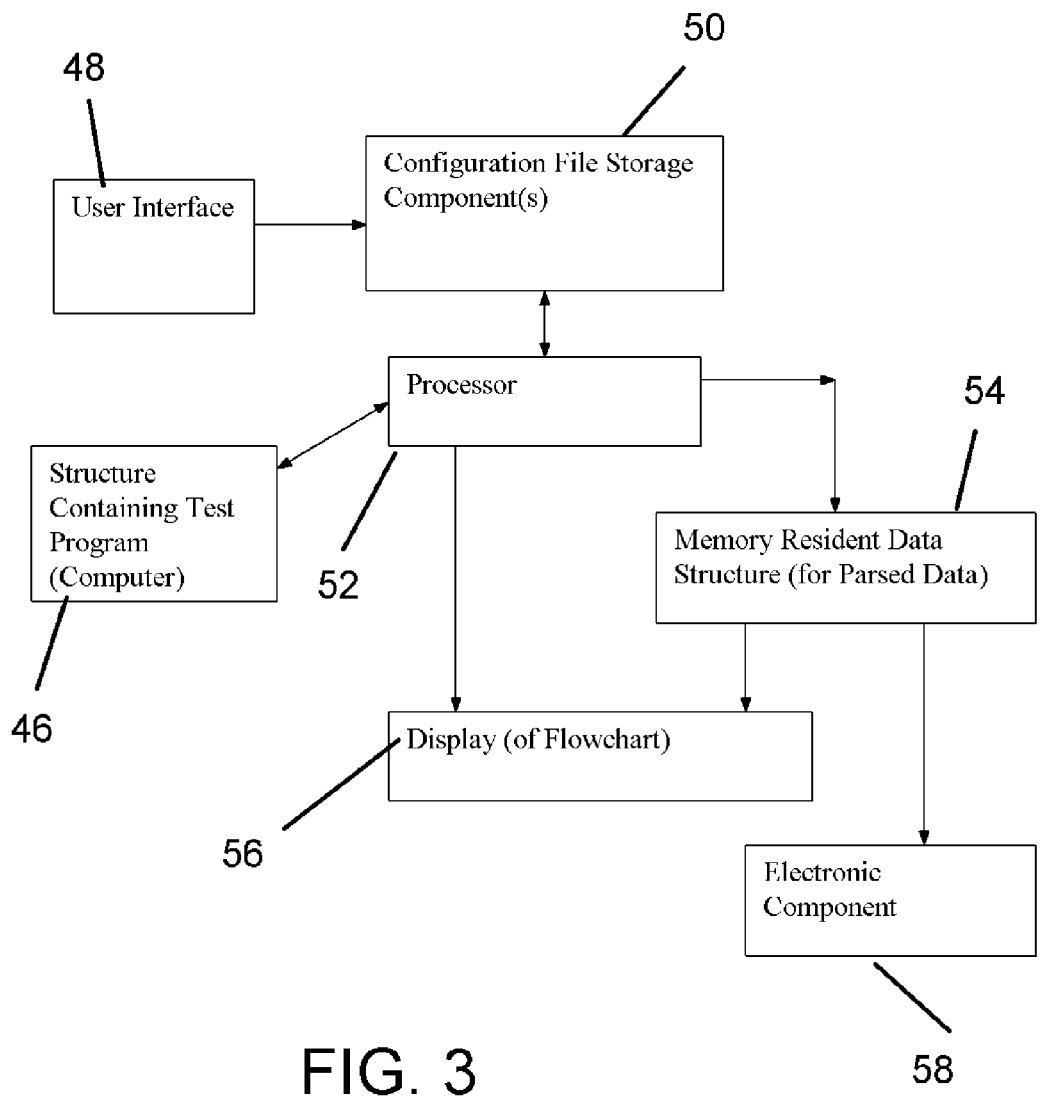
FIG. 3 shows an exemplifying, non-limiting structure that may be used to implement the process in accordance with the invention.

Referring now to FIG. 3, most of the structure needed to implement the process depicted in FIG. 1 and the flow chart illustrated in FIG. 2 has already been described above. However, FIG. 3 presents this structure in a concise matter.

The structure containing the test program 10 that will be converted to a flowchart 20 (see FIG. 1) is designated 46 and most often is a computer or workstation. It may be situated remote from the remaining structure of the invention and connected thereto over a network, such as a Local Area network or the Internet. A user interface 48 of a computer is provided to enable the user to select programming language and test station configuration files 12, 14 from one or more configuration file storage components 50. The configuration file storage components 50 may be memory components and may also be remotely located.

A processor 52 brings together the invention by obtaining the test program 10 from the structure 46 as well as the user-selected programming language and test station configuration files 12, 14 from the configuration file storage component(s) 50. Processor 52 then performs the data parsing as described above and directs the storage of the parsed data in a memory resident data structure 54, for possible later use for control of an electronic component 58. Processor 52 may also direct display of a flowchart derived from the parsed data on a display 56. The user interface 48, processor 52, data structure 54 and display 56 may all be implemented in a common processing unit such as a laptop computer, desktop computer, tablet, notebook, notepad, portable communications device, etc.

A computer program that performs the functions described above may be embodied in computer-readable media, and executed when desired. The computer program is configured to enable a user to select one of a plurality of programming language configuration files stored in at least one memory component, based on a programming language of a test program, and enable the user to select one of a plurality of test station configuration files stored in at least one memory component, based on a test station for which the test program is written. After such selection, the test program is parsed into parsed data using the regular expressions identified in the selected programming configuration and test program configuration files, and the parsed data is directed to be stored in a data structure. The parsed data in the data structure is subsequently interpreted to enable generation of a flowchart. This computer program may be resident on a laptop, portable computing device, desktop computer, handheld computing device, server accessible to the user over a network, in the "cloud" and in any other type of physical device that is capable of storing a computer program and enabling access thereto by a user handling a user interface.

An automatic flowchart generation tool having the above functionality and method for automatically generating flowcharts described above represent an improvement over prior art. For example, U.S. Pat. No. 5,446,911 (Juso et al.) describes an apparatus for automatically preparing a flowchart by analyzing a source program and a list of jump commands. The apparatus includes a source program memory that stores lines of the source program, a jump command memory that stores jump commands used in the source program, and an identification data producing unit that compares contents of the source program memory with contents of the jump command memory, and produces first and second identification data. The first identification data which are set for each command identifies the type of each command and identifies whether the execution contents of commands adjacent to each other along the sequence of commands are continuous. The second identification data are set for each jump command and each command to which processing is to be jumped. The first and second identification data are stored in the identification data memory. The process flow of the source program is analyzed based on the contents of the identification data memory. An analyzer analyzes the process flow of the source program based on the contents of the identification data memory and an output unit outputs the result of the analysis by the analyzer in the form of a flowchart.

The present invention provides several advantages over the automatic flowcharting preparation apparatus of Juso et al. For example, Juso et al. appears to operate with only a single predefined language, specifically a low-level assembly language. If this is the case, this implies that the apparatus of Juso et al. is hard-coded and not user configurable. By contrast, by utilizing separate, selectable configuration files for each language, namely, programming language configuration files 12, the invention is therefore limited only by the number of developed configuration files. These configuration files 12 contain the language rules describing the constructs and API calls for that specific language, and as new programming languages are sought to be used with the invention, appropriate programming language configuration files may be developed.

Juso et al. also does not enable a user to identify and/or customize the graphical shape(s) used to represent a particular statement in a flowchart and then subsequently, store this information in a flowcharting configuration file. Rather, Juso et al. appears to be hard-coded to produce predetermined shapes for specific language statements. By contrast, the invention is customizable and allows flexible configuration with regards to shapes displayed for individual language statements by appropriate construction of the flowcharting configuration file 18. This important feature allows an end user to tailor the invention for any application.

Reference is also made to the following U.S. patent publications, which together with the Juso et al. patent, are incorporated by reference herein.

U.S. Pat. No. 6,212,677 (Ohkubo et al.) describes a technique for generating a natural language specification of a computer program by generating an intermediate expression table based on a flow chart from analyzed syntax of the program. The specification is generated by analyzing the syntax of a predetermined computer program, generating a control flowchart based on the analyzed syntax, generating an intermediate expression table based on the control flowchart, providing block numbers for calls and branched destinations, and attaching an item number and a heading to every call and branched destination. This enables the specification of the computer program to be generated using a natural language based on the item number and the heading.

The present invention provides several advantages over the techniques of Ohkubo et al. For example, creation of a "control flowchart" in Ohkubo et al. is not only not equivalent of a universal graphical flowchart as generated by the invention with respect to function, but is also a proprietary data matrix containing the programmatical flow which is unlikely to result in creation of any graphical presentation. Moreover, Ohkubo et al. appears to operate with a single predefined language, specifically COBOL, i.e., the technique would likely be hard-coded and not user configurable. By contrast, the invention utilizes separate selectable configuration files for each language, namely programming language configuration files 12, and is therefore limited only by the number of developed configuration files.

U.S. Pat. No. 6,370,683 (Sobers) describes computer software for generating flowchart images of a source program that includes a first program which reads an input program source code as an input and generates a coded output file containing codes that a second program uses to create the shapes of the flowchart or list the copybooks and called programs used in the input program source code being flowcharted. Each line of the source program input is checked character for character for 'reserved words' of the source program language. When a 'reserved word' is found then a shape code is created. A single program flowchart can be created or by selecting a key word "AUTO", multiple program flowcharts can be created. The coded output file contains first, second, and third fields. The first field contains a three character shape identifier (the computer software includes 25 predefined shape identifiers). The second field contains a view number and a shape position. The view number indicates a particular flowchart screen for the program flowchart. The shape position indicates a particular position of a flowchart screen. Each flowchart screen can show up to nine shape positions. The second program of the inventive software reads the coded output file of the first program and displays the program flowchart images screen by screen.

The present invention provides several advantages over the flowchart image generating software of Sobers. For example, Sobers appears to limit the programming languages to either COBOL or COBOL II. That is, hard-coding of the software to operate with only these two languages seems to be required. The present invention is not limited to a specific computer language, because the fundamental concepts are applicable to any computer language. Use of separate selectable programming language configuration files 12, e.g., one for each programming language, limits the invention only by the number of developed programming language configuration files 12.

Another advantage of the invention is that it is capable of parsing whole lines of computer programs at once using regular expressions, leading to quicker execution times. By contrast, Sobers parses text character-by-character, which is extremely inefficient.

Sobers also discloses use of two separately executable modules to perform the operations, which configuration results in more manual steps to operate, and increased maintenance and configuration control. Providing a single module that performs both parsing and flowchart generation operations in accordance with the invention therefore reduces the number of manual steps, reduces maintenance and configuration control. A module in accordance with the invention (not shown) may comprise a housing with appropriate software and hardware components to store and/or enable access to, as applicable, the programming language configuration files 12, the test station configuration files 14, the parsed data 16, and the flowcharting configuration file 18.

Sobers also does not enable a user to identify and customize the graphical shape(s) used to represent a particular statement in a flowchart and then subsequently, store this information in a flowcharting configuration file. Rather, Sobers is hard-coded to produce predetermined shapes for specific language statements. By contrast, the invention is customizable and allows flexible configuration with regards to shapes displayed for individual language statements by appropriate construction of the flowcharting configuration file 18. This important feature allows an end user to tailor the invention for any application.

U.S. Pat. No. 6,408,430 (Gunter et al.) describes a method for visualizing and testing a sequence of a software code that includes instructions relating to assignment of variables, and decision branches. The method includes generating a plurality of nodes, edges and text indications that correspond to the instructions in the software code. A plurality of pointers are generated to associate the location of at least one line of the software code to at least one of the generated nodes. The pointers may also associate the location of a line in the software code to at least one of the generated edges. A flow chart representing the generated nodes, and edges and text indications, is displayed. When a user selects a node or an edge in the displayed flow chart, a corresponding portion of the software code is also identified.

The present invention provides several advantages over the method of Gunter et al. For example, Gunter et al. implies operation with a single predefined language, specifically Pascal. As a result, the method is likely required to be hard-coded and not user-configurable. By utilizing separate, selectable programming language configuration files 12 for each language, the invention is usable with a plurality of programming language and is limited only by the number of developed configuration files.

U.S. Pat. Appln. Publ. No. 20030159128 (Kunzler) describes a method and computer program for automatically generating flowcharting instructions from an electronic text file of a source code. Branch statements in the source code are identified, branch destinations for each of the identified branch statements are determined and the destinations are stored as destination records in a data structure. A statement type for each statement is identified using for example, keys such as a key word, phrase, punctuation marks or other symbols contained within each source code statement. The method is applied to source code statements written in any computer programming language. The instructions may then be imported into a drawing program where the flowchart may be drawn or viewed.

The present invention provides several advantages over the flowcharting instruction generation method and computer program of Kunzler. For example, Kunzler states that the computer programming language must be selected from Fortran, Cobol, C/C++, Pascal, Visual Basic and Perl. That is, hard-coding of the apparatus to operate with those languages only is required. The present invention has no limits on the programming language, which is feature is derived in part from the ability to provide any number of programming language configuration files 12, e.g., one for each different programming language. The invention is also scalable in that as new programming languages are developed, a corresponding programming language configuration file would be created and applied in the invention.

Another drawback of Kunzler's method and computer program that are addressed by the invention is that Kunzler does not enable a user to identify and/or customize the graphical shape(s) used to represent a particular statement in a flowchart and then subsequently, store this information in a configuration file. Instead, Kunzler is hard-coded to produce predetermined shapes for specific language statements. By contrast, the invention is customizable and allows flexible configuration with regards to shapes displayed for individual language statements. This important feature allows the end user to tailor the invention for any application, and is achieved in part by the definition of the flowcharting configuration file 18.

Yet another advantage of the invention is that parsed data 16 of each statement is stored in, for example, an XML document object as opposed to a proprietary database, linked list, an array or combination thereof. With current technology, it is quicker to transform an XML document than any of the other data structures mentioned. XML data can be stored in a XML document object according to a scheme identified by any XML standard so that the data object can be used elsewhere by another application using the same XML scheme. By contrast, Kunzler relies on proprietary data storage methods which prevent the utilization of the parsed data in external applications.

Having thus described a few particular embodiments of the invention, various alterations, modifications, and improvements will readily occur to those skilled in the art. For instance, the invention can be adapted to parse through other forms of data, such as written language, and result in flowcharted documentation or electronic control of instrumentation. Such alterations, modifications and improvements as are inherent or made obvious by this disclosure are intended to be part of this description though not expressly stated herein, and are intended to be within the spirit and scope of the invention. Accordingly, the foregoing description is by way of example only, and is not limiting. The invention is limited only as defined in the claims and equivalents thereto.

What is claimed is:

1. A method for generating a flowchart for a test program, comprising:
   selecting, using a processor, one of a plurality of programming language configuration files stored in at least one memory component, based on a programming language of the test program, each of the programming language configuration files being specific to one programming language and including regular expressions to identify lines of program code of the test program using keywords and constructs of the programming language;
   selecting, using a processor, one of a plurality of test station configuration files stored in at least one memory component, based on a test station for which the test program is written, each of the test station configuration files being specific to one test station and including regular expressions to identify lines of code of the test program that use application programming interfaces (APIs) to control specific instruments of the test station;
   parsing the test program into parsed data, using a processor and the regular expressions in the selected one of the programming language configuration files and the regular expressions in the selected one of the test station configuration files; and
   interpreting, using a processor, the parsed data to enable generation of the flowchart.

2. The method of claim 1, further comprising enabling a user to identify the programming language of the test program using a user interface, the one of the plurality of programming language configuration files being selected by the processor dependent on the user-identified programming language.

3. The method of claim 1, further comprising enabling a user to identify the test station for which the test program is written using a user interface, the one of the plurality of test station configuration files being selected by the processor dependent on the user-identified test station.

4. The method of claim 1, further comprising configuring the programming language configuration files and the test station configuration files with a scheme to aid parsing of the test program.

5. The method of claim 4, wherein the scheme in which the programming language configuration files and the test station configuration files are configured is a XML file.

6. The method of claim 4, wherein the scheme in which the programming language configuration files and the test station configuration files are configured involves database definitions that store the regular expressions.

7. The method of claim 1, further comprising storing the parsed data, prior to interpreting the parsed data to enable generation of the flowchart, according to a scheme such that similar keywords, constructs and API usage all flow the same way regardless of the programming language of the test program and/or the test station for which the test program is written.

8. The method of claim 7, further comprising storing the parsed data in a data structure prior to interpreting the parsed data to enable generation of the flowchart, wherein the data structure in which the parsed data is stored is a memory resident data structure and the scheme in which the parsed data is stored in an XML object or a database object with a predefined structure.

9. The method of claim 1, further comprising interpreting, using a processor and a flowcharting configuration file, the parsed data with algorithms that cause generation of the flowchart according to definitions defined in the flowcharting configuration file.

10. The method of claim 9, further comprising enabling a user to define the flowcharting configuration file to customize depiction of keywords, constructs and API references in the flowchart.

11. The method of claim 9, further comprising storing flowcharting representation information within the flowcharting configuration file using a scheme selected from a group consisting of a XML file and database definition.

12. The method of claim 1, further comprising generating a graphical output of the flowchart using the parsed data.

13. The method of claim 1, further comprising generating a different test program, in a different programming language than the programming language of the test program, using the parsed data.

14. The method of claim 1, further comprising controlling at least one electronic device using the parsed data.

15. The method of claim 1, further comprising:
   automating an external application that generates shapes, lines and other graphics using the parsed data to thereby generate the flowchart for the test program.

16. The method of claim 1, further comprising:
   generating, based on the parsed data, scripts interpretable into shapes, lines and other graphics; and
   automating an external application that generates shapes, lines and other graphics using the parsed data to thereby generate the flowchart for the test program.

17. The method of claim 1, wherein the parsing of the test program into parsed data is performed by parsing at least one whole line of code of the test program at the same time or parsing multiple lines of code of the test program at the same time.

18. The method of claim 1, wherein the plurality of programming language configuration files are created such that each of the programming language configuration files is associated with respective, different programming language.

19. The method of claim 1, further comprising
   selecting, using the processor or a different processor, one of a plurality of flowcharting configuration files, based on the selected one of the programming language configuration files; and
   interpreting, using the processor or a different processor and the selected one of the flowcharting configuration files, the parsed data with algorithms that cause generation of the flowchart according to definitions defined in the selected one of the flowcharting configuration files.

20. An arrangement for generating a flowchart for a test program, comprising:

at least one memory component containing a plurality of programming language configuration files and a plurality of test station configuration files, each of the programming language configuration files being specific to one programming language and including regular expressions to identify lines of program code of a test program using keywords and constructs of a programming language of the test program, each of the test station configuration files being specific to one test station and including regular expressions to identify lines of code of the test program that use application programming interfaces (APIs) to control specific instruments of a test station for which the test program is written;

at least one user interface that enables a user to select one of the programming language configuration files stored in said at least one memory component and one of the test station configuration files stored in said at least one memory component; and a processor coupled to said user interface and said at least one memory component and that parses the test program into parsed data using the regular expressions identified in the selected one of the programming language configuration files and the regular expressions in the selected one of the test station configuration files, whereby the parsed data is interpreted to enable generation of the flowchart.

21. A computer program embodied in non-transitory computer-readable media and configured to:

enable a user to select one of a plurality of programming language configuration files stored in at least one memory component, based on a programming language of a test program, each of the programming language configuration files being specific to one programming language and including regular expressions to identify lines of program code of a test program using keywords and constructs of the programming language of the test program;

enable the user to select one of a plurality of test station configuration files stored in at least one memory component, based on a test station for which the test program is written, each of the test station configuration files being specific to one test station and including regular expressions to identify lines of code of the test program that use application programming interfaces (APIs) to control specific instruments of the test station; and parse the test program into parsed data using the regular expressions identified in the selected one of the programming language configuration files and the regular expressions in the selected one of test station configuration files, whereby the parsed data is stored and subsequently interpreted to enable generation of a flowchart.

22. The method of claim 1, further comprising selecting, using the processor or a different processor, one of a plurality of flowcharting configuration files, based on the selected one of the test station configuration files; and interpreting, using the processor or a different processor and the selected one of the flowcharting configuration files, the parsed data with algorithms that cause generation of the flowchart according to definitions defined in the selected one of the flowcharting configuration files.

* * * * *